United States Patent
Shida

(10) Patent No.: US 8,098,659 B2
(45) Date of Patent: Jan. 17, 2012

(54) COMMUNICATION APPARATUS, COMMUNICATION SYSTEM INCLUDING THE SAME, AND METHOD FOR SETTING IP ADDRESS OF COMMUNICATION APPARATUS

(75) Inventor: Tsuyoshi Shida, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1047 days.

(21) Appl. No.: 11/608,930

(22) Filed: Dec. 11, 2006

(65) Prior Publication Data

US 2007/0133544 A1    Jun. 14, 2007

(30) Foreign Application Priority Data

Dec. 12, 2005  (JP) .................... 2005/357599

(51) Int. Cl.
*H04L 12/28*    (2006.01)

(52) U.S. Cl. ........ 370/389; 370/351; 709/203; 709/220; 709/222; 709/223; 709/224; 709/225; 709/245; 709/250

(58) Field of Classification Search .................. 370/351, 370/354, 389, 392; 709/203
See application file for complete search history.

(56) References Cited

U.S. PATENT DOCUMENTS

| | | | |
|---|---|---|---|
| 6,925,079 B2 | 8/2005 | Matsukawa | |
| 6,957,276 B1 * | 10/2005 | Bahl | 709/245 |
| 7,185,079 B1 * | 2/2007 | Bainbridge et al. | 709/223 |
| 7,440,440 B1 * | 10/2008 | Abichandani et al. | 370/351 |
| 2002/0159448 A1 * | 10/2002 | Ito et al. | 370/389 |
| 2006/0221955 A1 * | 10/2006 | Enright | 370/389 |
| 2007/0097992 A1 * | 5/2007 | Singh et al. | 370/395.54 |
| 2007/0248098 A1 * | 10/2007 | Chen | 370/395.2 |

FOREIGN PATENT DOCUMENTS

| | | |
|---|---|---|
| JP | 2001-244945 | 9/2001 |
| JP | 2004-253843 | 9/2004 |
| JP | 2005-327075 | 11/2005 |

OTHER PUBLICATIONS

English language Abstract of JP 2001-244945.

* cited by examiner

*Primary Examiner* — Hassan Phillips
*Assistant Examiner* — Gautam Sharma
(74) *Attorney, Agent, or Firm* — Greenblum & Bernstein, P.L.C.

(57) ABSTRACT

An communication apparatus relays communication between a network device and an IP network, and assigns an IP address within a reserved range of IP address to the network device. The communication apparatus includes an address setter that sets an IP address of the communication apparatus; and the address conflict determiner that determines whether or not the IP address of the communication apparatus conflicts with the IP address of the network device, based on a result of query to the network device. When the IP address of the communication apparatus conflicts with the IP address of the network device, the address setter changes the IP address of the communication apparatus to a new IP address selected out of a reserved range of IP address.

5 Claims, 6 Drawing Sheets

COMMUNICATION APPARATUS, COMMUNICATION SYSTEM INCLUDING THE SAME, AND METHOD FOR SETTING IP ADDRESS OF COMMUNICATION APPARATUS

BACKGROUND OF THE INVENTION

1. Field of the Invention

The present invention relates to an communication apparatus, such as IP (Internet Protocol) communication apparatus, that performs communication over an IP network, such as the Internet and the like; an communication system; and a method for setting an IP address of the communication apparatus. The present invention particularly relates to an communication apparatus having a router function, such as a DHCP (Dynamic Host Configuration Protocol) server function and the like; an communication system including the communication apparatus; and a method for setting an IP address of the communication apparatus.

2. Description of Related Art

Conventionally, when communication apparatuses, such as an IP telephone apparatus and the like, are used to perform communication on an IP network, unique IP addresses need to be assigned in order to identify the apparatuses. For example, when communication apparatuses, which are provided on a predetermined LAN (Local Area Network), are connected to the Internet and the like via a relay device, such as a router and the like, a user (or a network administrator) of the communication apparatuses can manually set IP addresses on each of the apparatuses so as to avoid an IP address conflict among the apparatuses within the LAN. Instead of manual setting by a user, a method is known for automatically setting IP addresses via DHCP. In the method, communication apparatuses connected to a network can use IP addresses reserved on a predetermined DHCP server. The DHCP server dynamically assigns the IP addresses in response to a request from each apparatus such as when the apparatus starts. In addition, the DHCP server can retrieve the IP addresses assigned to the apparatuses that have completed communication, and reassign the IP addresses to other apparatuses.

In the above-described IP address assignment to the communication apparatuses, however, an IP address may conflict with an IP address of another apparatus, when, for example, a user erroneously assigns to a predetermined communication apparatus, an IP address already assigned to another apparatus as a fixed IP address, or when an communication apparatus starts, the apparatus being assigned with an IP address identical to an IP address assigned to another apparatus already connected to the network. Such IP address conflict may hamper proper transmission and reception of a packet, and thus causing a communication failure.

A conventional technology exists for detecting such IP address conflict. For instance, in a network system where a host that checks and detects an IP address conflict and a plurality of hosts to be checked are connected to a same LAN, the host that checks and detects the IP address conflict transmits to the hosts to be checked via the LAN, an ARP request packet that contains an IP address to be checked on a subnet same as the host that checks and detects the IP address conflict. The IP address conflict is detected based on whether or not an ARP reply packet is transmitted from the hosts to be checked to the host that checks and detects the IP address conflict via the LAN (refer to Related Art 1).

[Related Art 1] Japanese Patent Laid-open Publication 2001-244945

However, the conventional technology disclosed in above-described Related Art 1 requires a user to eliminate the IP address conflict when detected, such as by manually changing IP address setting of each apparatus. Further, even though the IP address conflict is eliminated, there may be a case where the same IP address is reassigned by the DHCP server, when the above-described DHCP server is used to assign the IP addresses to the apparatuses and the changed IP address is included in a range of the IP addresses reserved on the DHCP server, thereby repeating the same conflict.

Moreover, for an communication apparatus having a router function, such as, for example, a DHCP server function, IP addresses need to be assigned, so that an address space of IP addresses on a LAN, to which a plurality of network devices, such as a PC (personal computer) and the like, are connectable, does not conflict with an address space of WAN (Wide Area Network) IP addresses, which are obtained through the DHCP server and the like.

SUMMARY OF THE INVENTION

The present invention is provided to address the problem in the conventional art. A first object of the present invention is to provide an communication apparatus capable of appropriately setting an IP address thereof while avoiding an IP address conflict with another apparatus on a same network, without requiring a user to perform a cumbersome setting operation; an communication system including the communication apparatus; and a method for setting an IP address of the communication apparatus. Further, a second object of the present invention is to provide an communication apparatus capable of appropriately setting a LAN IP address thereof while avoiding an address space conflict with a WAN IP address thereof, without requiring a user to perform a cumbersome setting operation; an communication system including the communication apparatus; and a method for setting an IP address of the communication apparatus.

An aspect of the present invention provided to address the above-described problem provides a communication apparatus being connected with a network device, relaying communication between the network device and an IP network, the communication apparatus comprising: an address assigner that assigns a first IP address within a reserved range of IP address to the network device; an address memory that store an second IP address of the communication apparatus; an address conflict determiner that determines whether the second IP address conflicts with the first IP address; and an address setter that changes the second IP address to an third IP address out of the reserved range of IP address.

Even when the IP address set on the communication apparatus having a router function conflicts with the IP address of the network device (e.g., a PC having an IP telephone function, an IP telephone, and the like) on the same LAN, the configuration above allows setting of an appropriate IP address while avoiding an IP address conflict with the network device, without requiring a user to perform a cumbersome setting operation.

The IP address to be changed when the IP address conflict occurs herein is selected out of the reserved range of IP addresses assigned to the network device (i.e., IP addresses leasable through a DHCP server function). Thereby, after the IP address of the communication apparatus is changed, the same IP address is no longer newly assigned to the network device, and thus no IP address conflict occurs thereafter.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, with reference to the above-described drawings.

Figure 1:
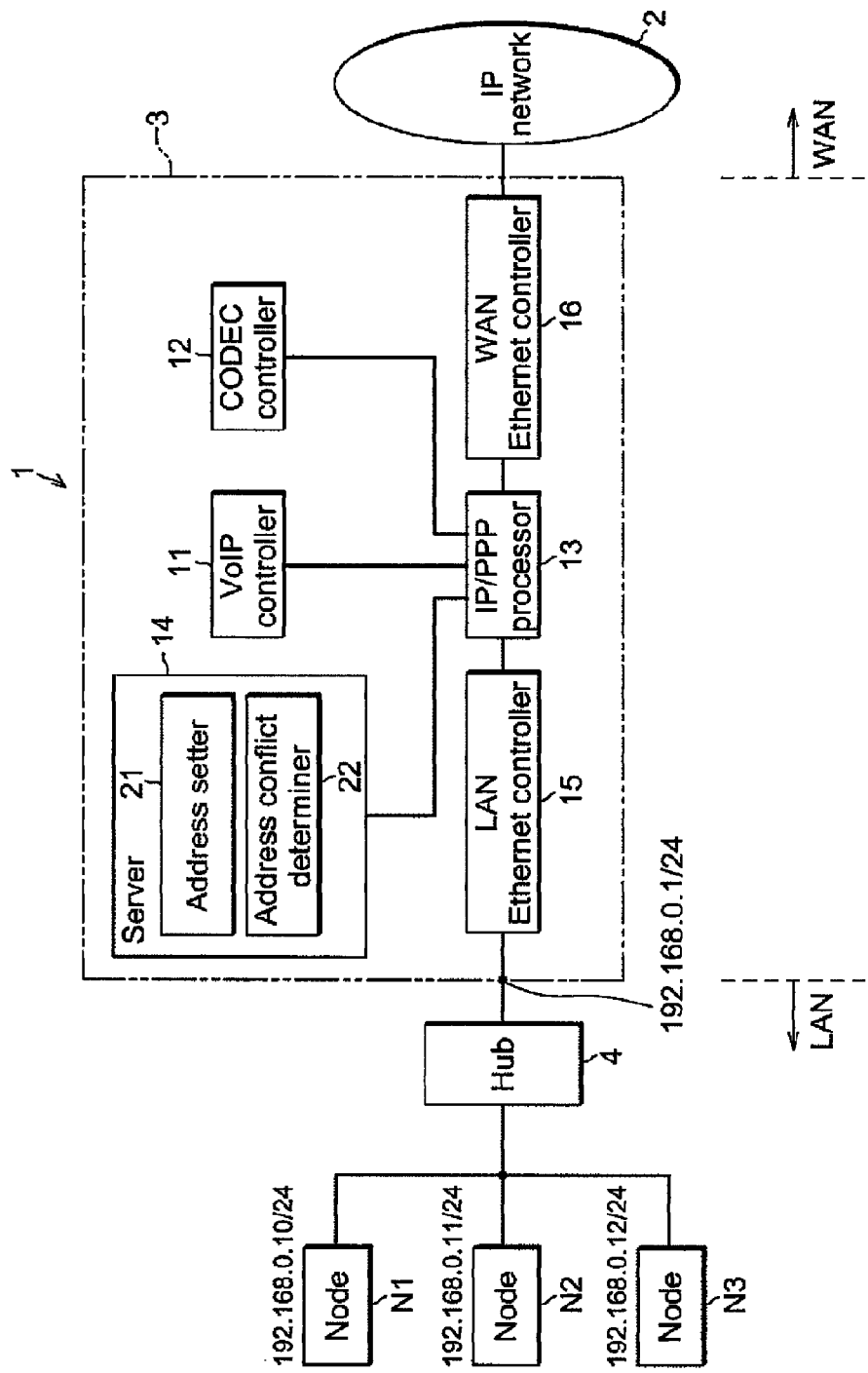
FIG. 1 illustrates a schematic configuration of an communication system according to a first embodiment of the present invention.

FIG. 1 illustrates a schematic configuration of an communication system according to the first embodiment of the present invention. communication system 1 mainly includes: IP telephone apparatus 3 that transmits and receives audio data over IP network 2 so as to perform voice communication with a destination apparatus (not shown in the figure); and nodes N1 to N3 connected to IP telephone apparatus 3 via hub 4.

Figure 2:
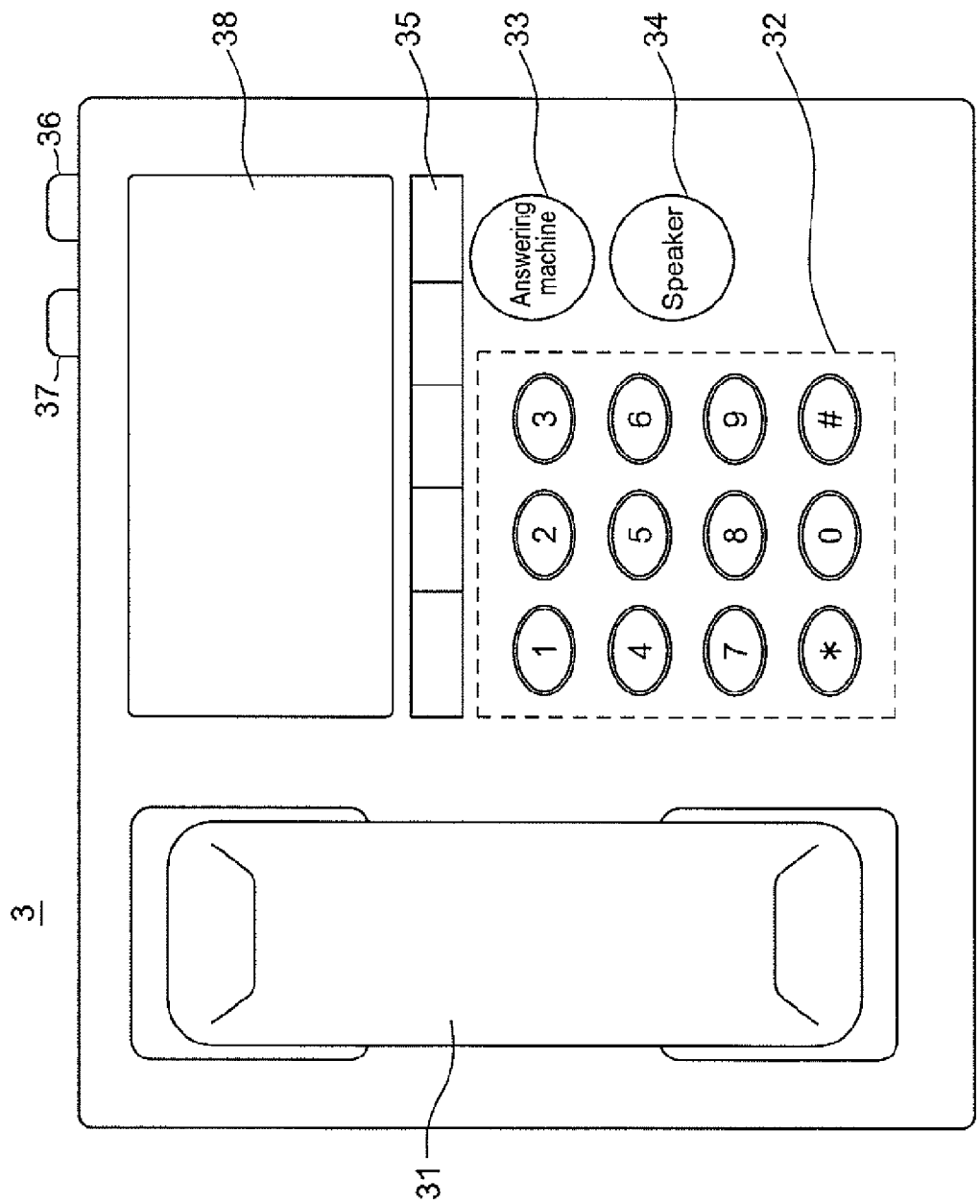
FIG. 2 is an external front view of IP telephone apparatus 3 in FIG. 1.

FIG. 2 is an external front view of IP telephone apparatus 3. IP telephone apparatus 103 (hereinafter described) also has a similar configuration. In FIG. 2, IP telephone apparatus 3 includes: handset 31 provided with a microphone that receives a voice of an operator and with a speaker that outputs the received voice; ten-key pad 32 that accepts input of a telephone number and the like; answering machine key 33 that toggles an answering machine function; speaker key 34 that switches a voice to external output; and function keys 35 that allow setting of a variety of functions, including one-touch dialing and the like. Further provided on a side surface are LAN interface 36 connected to hub 4 and WAN interface 37 connected to IP network 2. Display 38, which includes an LCD and the like, is also provided above function keys 35.

IF telephone apparatus 3 has a router function that relays communication via IP network 2 for nodes N1 to N3. IP telephone apparatus 3 is provided with VoIP controller 11, CODEC controller 12, IP/PPP processor 13, server 14, LAN Ethernet controller 15, and WAN Ethernet controller 16.

VoIP controller 11 executes a variety of controls to perform voice communication over IP network 2. For example, VoIP controller 11 controls communication over IP network 2 compliant with SIP (Session Initiation Protocol); and data transfer compliant with RTP (Real-time Transport Protocol) to allow real-time audio data transfer.

CODEC controller 12 controls coding and encoding of the audio data transmitted to and received from a destination apparatus over IP network 2; and a jitter buffer that absorbs delay or distortion in audio data communication, so as to achieve stable playback of a call voice.

IP/PPP processor 13 controls layer 3 (a network layer), including selection of a data transmission line, conversion of a packet size, and the like.

Server 14 implements the router function so as to control the network. For example, server 14 controls assignment and retrieval of an IP address to and from nodes N1 to N3, complying with DHCP (Dynamic Host Configuration Protocol) (the DHCP server function); and performs control to allow nodes N1 to N3, to which local IP addresses are assigned with NAT (Network Address Translation) or NAPT (Network Address Port Translation), to transparently access IP network 2.

Server 14 includes address setter 21 and address conflict determiner 22, which will be described in detail hereinafter. Address setter 21 sets an IP address on LAN interface 36 of IP telephone apparatus 3. Address conflict determiner 22 determines whether the IP address of LAN interface 36 conflicts with any of IP addresses assigned to nodes N1 to N3. When address conflict determiner 22 confirms that the IP address of LAN interface 36 on IP telephone apparatus 3 conflicts with one of the IP addresses of node N1 to N3, address setter 21 changes the IP address of LAN interface 36 to an appropriate IP address so as to avoid the conflict.

LAN Ethernet controller 15 controls layer 2, including error correction of an electric signal, a retry request, and the like on a LAN. Similarly, WAN Ethernet controller 16 controls layer 2 (a data link layer) on a WAN.

Nodes N1 to N3 represent desired network devices, such as a PC (personal computer) or a device having an IP communication function, which are connected to the LAN. Such network devices are capable of performing communication over IP network 2 using the router function of IP telephone apparatus 3 as a default gateway. The number of nodes connected to IP telephone apparatus 3 is not limited to as shown in FIG. 1, but may be changed appropriately according to requirements.

When nodes N1 to N3 having no IP addresses are connected to IP telephone apparatus 3, each of nodes N1 to N3 can obtain an IP address (a local IP address on the LAN herein) through the DHCP server function of IP telephone apparatus 3. Server 14 of IP telephone apparatus 3 in this case can dynamically assign to nodes N1 to N3, IP addresses selected from reserved leasable IP addresses.

In communication system 1 having the above-described configuration, an address space (i.e., a range of host addresses on a predetermined network regarded as an administration unit) used on the LAN is already set to a range of "192.168.0.0 to 192.168.0.255" (a netmask is "255.255.255.0", which is referred to as "/24" hereinafter), for explanation purposes. Further, IP addresses leasable to nodes N1 to N3 from server 14 of IP telephone apparatus 3 are already set to a range of "192.168.0.10 to 192.168.0.50/24". FIG. 1 shows an example where the following IP addresses are assigned: "192.168.0.10/24" to node N1; "192.168.0.11/24" to node N2; and "192.168.0.12124" to node N3. The IP addresses are 32-bit numbers compliant with IPv4. However, the IP addresses are not limited to the protocol, and may be defined based on another protocol (IPv6 and the like).

An IP address of LAN interface 36 on IP telephone apparatus 3 ("192.168.0.1/24" in FIG. 1) is set as default to, for example, a value manually set by a user using an operation key (not shown in the figure) or a factory-set value. Meanwhile, an IP address of the WAN interface (a global IP address herein) on IP telephone apparatus 3 can be dynamically assigned by a predetermined ISP (Internet Service Provider) and the like. For the assignment, IP telephone apparatus 3 operates as a PPPoE (Point to Point Protocol over Ethernet) client using a PPPoE fuction of IP/PPP processor 13. As the IP address of WAN interface 37 on IP telephone apparatus 3, it is also possible to use an IP address dynamically assigned from a DHCP server (not shown in the figure) or a fixed IP address manually set by the user.

The IP address of LAN interface 36 on IP telephone apparatus 3 needs to be different from the IP addresses of nodes N1 to N3. When the IP addresses of nodes N1 to N3 are set manually, however, an IP address identical to the manually set IP addresses may be set on LAN interface 36 of IP telephone apparatus 3. IP telephone apparatus 3 thus checks an IP address conflict at a time when such conflict may occur, such as during start-up of the apparatus or connection of communication with hub 4 (e.g., when re-connecting after having been disconnected since a communication cable was unplugged, hub 4 was turned off, and the like). When confirming that a conflict is occurring, IP telephone apparatus 3 changes and sets the IP address of LAN interface 36 to an appropriate value.

Described below is a detailed operation for avoiding the IP address conflict of LAN interface 36 on IP telephone apparatus 3.

Figure 3:
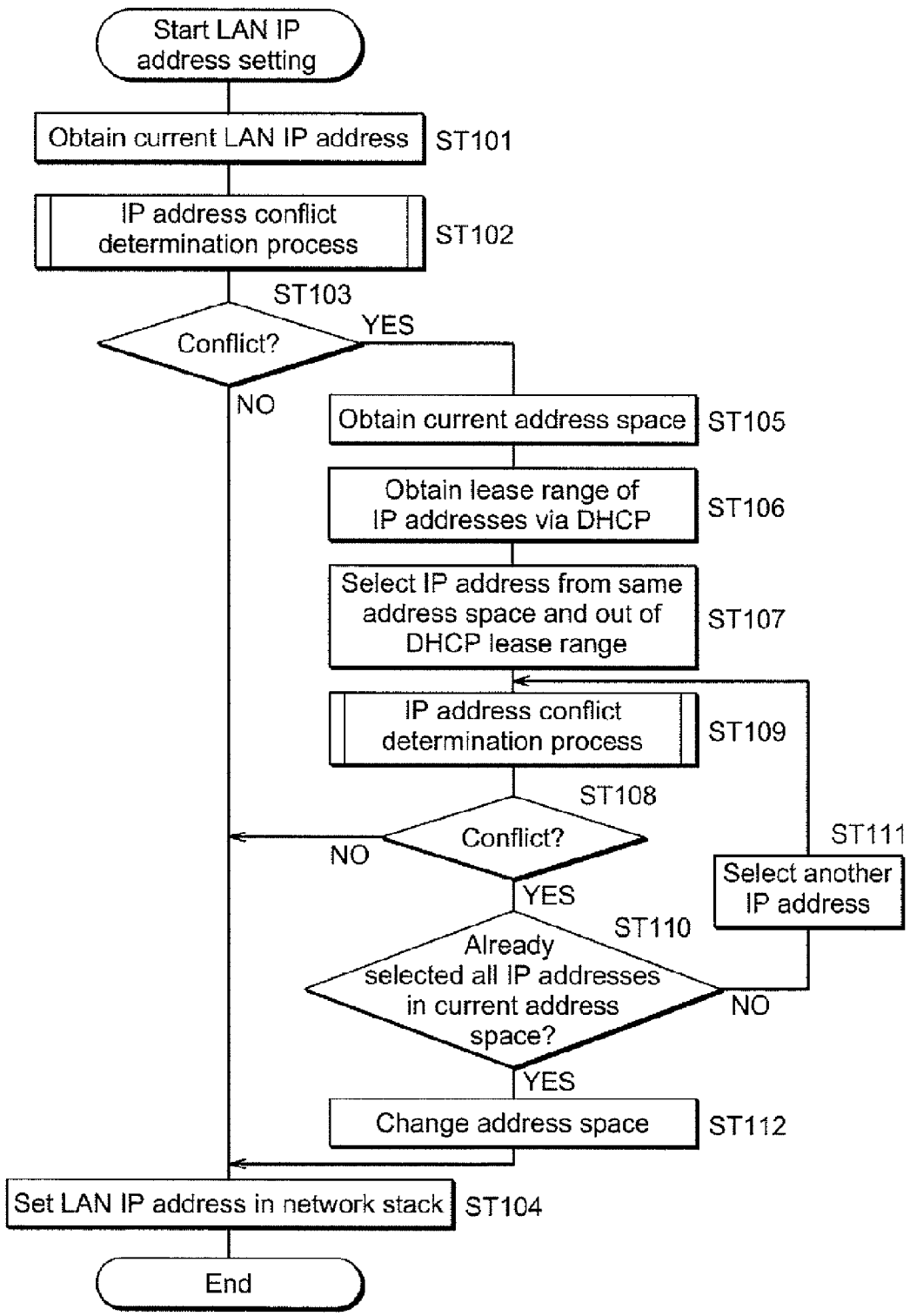
FIG. 3 is a flowchart illustrating an IP address setting operation on the IP telephone apparatus in FIG. 1.

FIG. 3 is a flowchart illustrating an operation for setting an IP address on LAN interface 36 of the IP telephone apparatus in FIG. 1. When IP address setting control starts as the IP telephone apparatus starts or connects to hub 4 for communication, address conflict determiner 22 first obtains an IP address (e.g., "198.168.0.1/24") currently set (or selected to be set) on LAN interface 36 of the IP telephone apparatus (ST101), and then performs a process for determining an IP address conflict with an IP address of each of nodes N1 to N3 (ST102). In the conflict determination process, IP telephone apparatus 3 performs a query to each of nodes N1 to N3, asking whether or not the IP address conflicts, and then confirms the existence of conflict based on query results.

When it is confirmed that the IP address does not conflict based on the results of the conflict determination process in ST102 (ST103: No), address setter 21 recognizes that the IP address currently set on LAN interface 36 is usable; sets the usable IP address in IP/PPP processor 13 that controls a network stack (corresponding to layer 3, or a network layer, herein) (ST104); and then completes the IP address setting control.

On the other hand, when it is confirmed that the IP address conflicts (ST103: Yes), address setter 21 obtains address space information (e.g., "192.168.0.0 to 192.168.0.255/24") to which the IP address currently set on LAN interface 36 belongs. Subsequently, address setter 21 obtains information of a leasable IP address range on server 14 (e.g., "192.168.0.10 to 192.168.0.50/24"). Then, address setter 21 selects one IP address (e.g., "192.168.0.2/24") from the address space to which the IP address currently set on LAN interface 36 belongs and out of the leasable IP address range on server 14 (ST107). Similar to ST102, address conflict determiner 22 performs the process for determining the IP address conflict between the selected IP address and the IP addresses of nodes N1 to N3 (ST108). An address used for a particular purpose, such as broadcast and the like, is excluded from the IP address selection herein. When it is confirmed that the selected IP address still conflicts, address setter 21 adds "1" to the currently selected IP address, and address conflict determiner 22 performs the conflict determination process for the incremented IP address, similar to ST102. For instance, in a case where the selected IP address is "192.168.0.1"; the subnet is "255.255.255.0"; and the IP address range assigned by the DHCP server is from "192.168.0.10" to "192.168.0.29"; address setter 21 changes IP addresses, that is, for example, "192.168.0.1", "192.168.0.2", . . . , "192.168.0.9", "192.168.0.30", and "192.168.0.31", and address conflict determiner 22 performs the conflict determination process for the changed IP addresses. Address setter 21 and address conflict determiner 22 repeat the above-described processes until it is confirmed that the IP address set on LAN interface 36 does not conflict with the IF addresses of nodes N1 to N3.

When it is confirmed that the IP address does not conflict based on results of the conflict determination process in ST108 (ST109: No), address setter 21 proceeds to ST104. In ST104, address setter 21 sets the usable IP address in IP/PPP processor 13, and then completes the IP address setting control. On the other hand, when the IP address conflicts yet again (ST109: Yes), address conflict determiner 22 checks whether or not all the IP addresses in the address space to which the IP address currently set on LAN interface 36 belongs are selected (i.e., there is a possibility that all the IP addresses in the current address space may conflict with the IP addresses of nodes N1 to N3.) (ST110). When there is a selectable IP address in the current address space, address setter 21 selects an IP address (e.g., "192.168.0.3/24") that has not been selected, similar to ST107 (ST111), and then returns to ST108 again. As described above, address setter 21 repeats new IP address selection while the IP address conflicts.

When it is eventually confirmed that all the IP addresses in the current address space have already been selected (ST110: Yes), address setter 21 changes the current address space to another address space (e.g., "192.168.1.0 to 192.168.1.255/24", "10.0.0.0 to 10.255.255.255/8", "172.16.0.0 to 172.16.255.255/16", and the like), and selects one IP address from the another address space (ST112). Then, address setter 21 sets in the network stack, the IP address selected from the changed address space (ST104), and completes the IP address setting control.

Described below is a detailed process for determining the IP address conflict (ST102 and ST108) in the IP address setting operation in FIG. 3.

Figure 4:
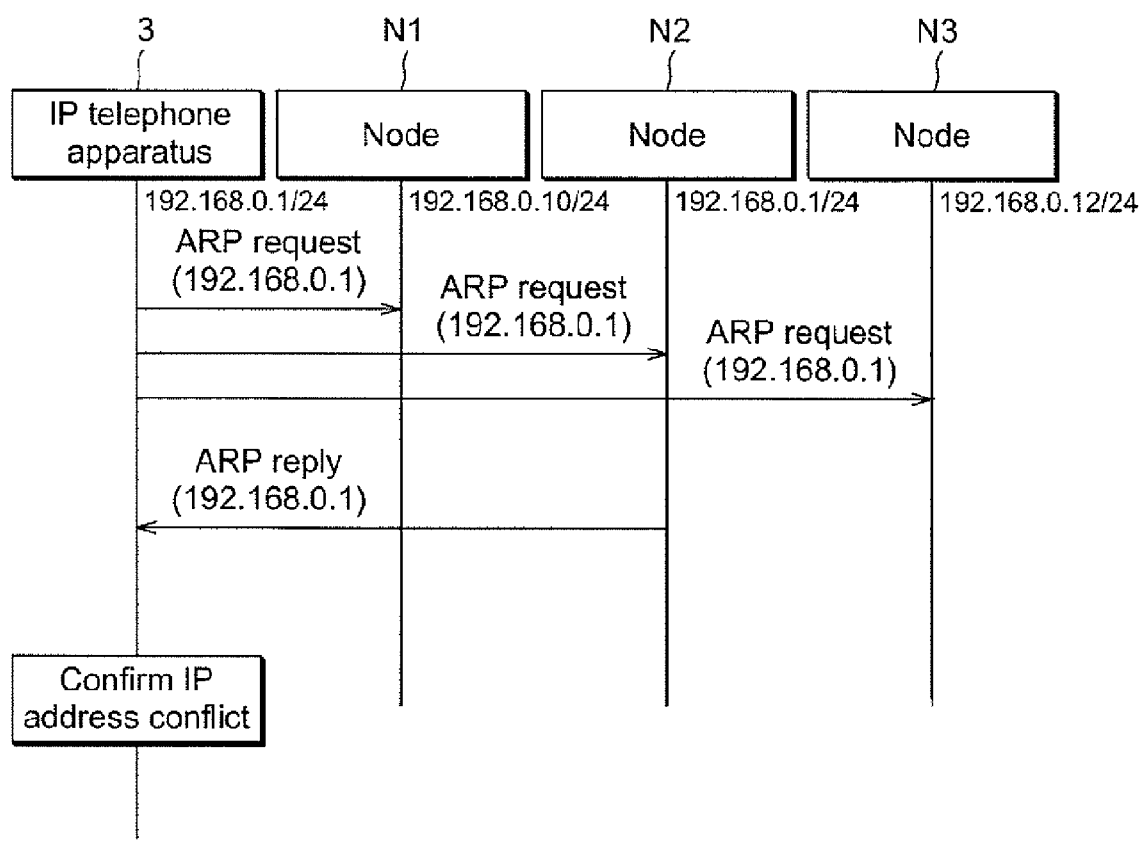
FIG. 4 is a sequence diagram illustrating a detailed conflict determination process in the IP address setting operation in FIG. 3.

FIG. 4 is a sequence diagram illustrating the detailed conflict determination process in the IP address setting operation in FIG. 3. Different from the case in FIG. 1, FIG. 4 shows a case where the IP address of node N2 is manually set to "192.168.0.1/24", and the IP address conflicts with the IP address of LAN interface 36 on IP telephone apparatus 3.

When the conflict determination process starts, address conflict determiner 22 broadcasts an ARP (Address Resolution Protocol) request message from IP/PPP processor 13 so as to perform a query to nodes N1 to N3 for an IP address conflict. The ARP request message is used for requesting MAC (Media Access Control) address information to nodes N1 to N3, normally on which predetermined IP addresses are set. As the predetermined IP address (that is, the IP address of the apparatus supposed to reply to the message), the current IP address information ("192.168.0.1/24") of LAN interface 36 on IP telephone apparatus 3 is added herein.

In addition to receiving the ARP request message from IP telephone apparatus 3, each of nodes N1 to N3 has a function to return an ARP reply message as required. Using the function, each of nodes N1 to N3 transmits the ARP reply message, which includes information, such as the MAC address, the IP address, and the like of the node, only when the IP address of the node coincides with the IP address included in the ARP request message.

In FIG. 4, node N2, which has received the ARP request message from IP telephone apparatus 3, transmits the ARP reply message to IP telephone apparatus 3. When receiving the ARP reply message, IP telephone apparatus 3 recognizes that the current IP address of LAN interface 36 conflicts with the IP address of node N2.

When IP telephone apparatus 3 receives no ARP reply message from any of nodes N1 to N3 in a predetermined time from transmission of the ARP request message, IP telephone apparatus 3 recognizes that the IP address of LAN interface 36 conflicts with none of the IP addresses of nodes N1 to N3.

As described above, IP telephone apparatus 3 can determine whether or not the IP address of LAN interface 36 conflicts with the IP address of each of nodes N1 to N3, through transmission and reception of the ARP message.

Figure 5:
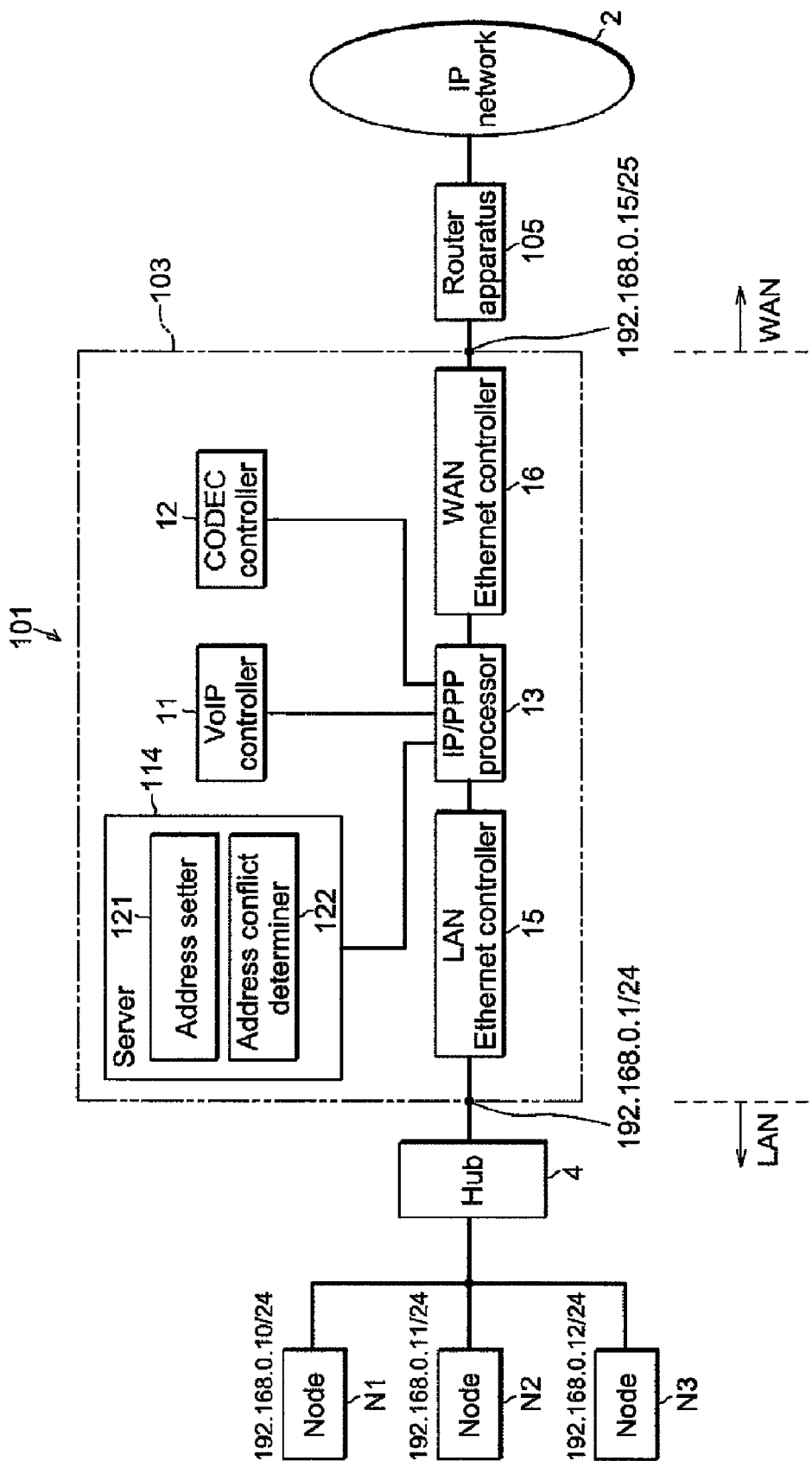
FIG. 5 illustrates a schematic configuration of an communication system according to a second embodiment of the present invention.

FIG. 5 illustrates a schematic configuration of an communication system according to the second embodiment of the present invention. communication system 101 is different from communication system 1 in FIG. 1, in that IP telephone apparatus 103 is connected to IP network 2 via a predetermined relay device (router apparatus 105 in this configuration). In communication system 101 in FIG. 5, components same as in communication system 1 in FIG. 1 are provided with same reference numerals. Descriptions thereof are same as in communication system 1, unless otherwise specifically mentioned below.

Router apparatus 105 relays communication of IP telephone apparatus 103 on IP network 2. Router apparatus 105 also has a DHCP server function that dynamically assigns an IP address (a local IP address herein) of a WAN interface, in response to a request from IP telephone apparatus 103.

Similar to IP telephone apparatus 3 in FIG. 1, IP telephone apparatus 103 has a function to avoid a conflict between an IP address of a LAN interface and an IP address of each of nodes N1 to N3. On IP telephone apparatus 103, there may be a case where an address space (e.g., "192.168.0.0 to 192.168.0.255/24") to which the IP address (e.g., "192.168.0.1/24") of the LAN interface belongs conflicts with an address space (e.g., "192.168.0.0 to 192.168.0.127/25") to which an IP address (e.g., "192.168.0.15/25") of the WAN interface belongs, the IP address being dynamically assigned by router apparatus 105. IP telephone apparatus 103 is thus further provided with the function to avoid the conflict between the address spaces of the LAN interface and of the WAN interface.

Server 114 has similar functions as server 14 in FIG. 1. Server 114 has address setter 121 and address conflict determiner 122. Address setter 121 sets an IP address on the LAN interface of IP telephone apparatus 103. Address conflict determiner 122 determines whether the IP address set on the LAN interface conflicts with any of IP addresses of nodes N1 to N3, which are connected to IP telephone apparatus 103. In the present embodiment, address conflict determiner 122 further determines whether or not the address space to which the IP address of the LAN interface belongs conflicts with the address space to which the IP address of the WAN interface dynamically assigned by router apparatus 10S When the address space of the LAN interface conflicts with the address space of the WAN interface on IP telephone apparatus 103, address setter 121 changes the IP address of the LAN interface to an IP address selected from an address space different from the address space of the LAN interface so as to avoid the conflict. When avoiding the conflict, address setter 121 prioritizes the IP address of the WAN interface and changes the IP address of the LAN interface, so as to allow reception from the IP network.

Figure 6:
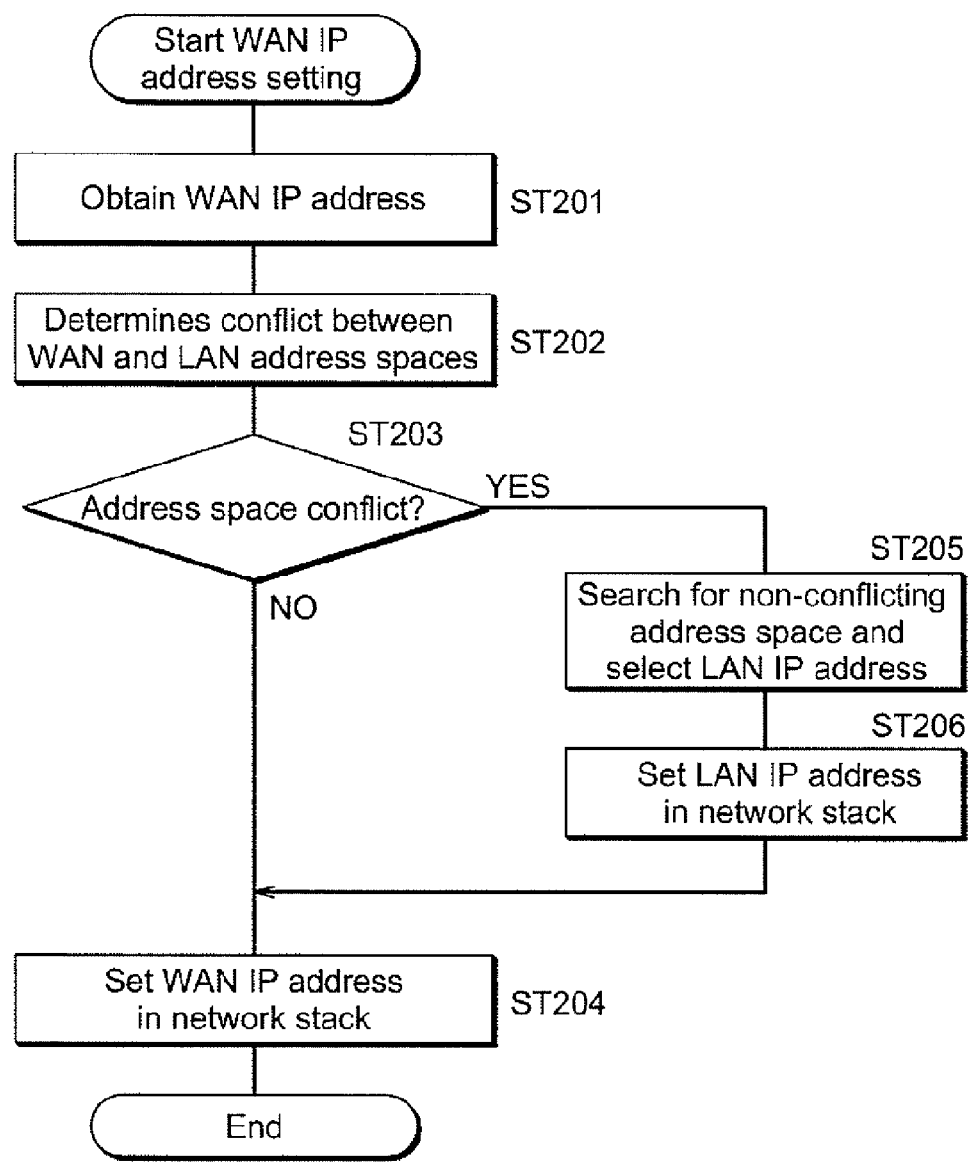
FIG. 6 is a flowchart illustrating an IP address setting operation on an IP telephone apparatus in FIG. 5.

FIG. 6 is a flowchart illustrating an operation for setting an IP address on the IP telephone apparatus in FIG. 5. The IP address setting operation is performed such as when a lease period has expired for a WAN interface address assigned by router apparatus 105, and thus an IP address is obtained again. When IP address setting control starts, address conflict determiner 122 first obtains an IP address currently set (or selected to be set) on the WAN interface (ST201), and then performs a process for determining a conflict between an address space to which the IP address of the WAN interface belongs and an address space to which the IP address of the LAN interface belongs (ST202). In the process, it is determined that the address spaces conflict when at least a part of the address spaces is the same, if not completely the same.

When it is confirmed that the address spaces do not conflict based on results of the conflict determination process (ST203: No), address setter 121 sets the IP address currently set on the WAN interface in a network stack in IP/PPP processor 13 (ST204), and then completes the IP address setting control.

On the other hand, when it is confirmed that the address spaces conflict (ST203: Yes), address setter 121 searches for an address space (e.g., "192.168.1.0 to 192.168.1.255") that does not conflict with the address space (e.g., "192.168.0.0 to 192.168.0.255") to which the IP address (e.g., "192.168.0.1/24") currently set on the LAN interface belongs. Then, address setter 121 selects one IP address (e.g., "192.168.1.1/24") from the address space that does not conflict, as the IP address of the LAN interface (ST205). Subsequently, address setter 121 sets the selected IP address of the LAN interface in the network stack in IP/PPP processor 13 (ST206); further sets the current IP address of the WAN interface in the network stack (ST204); and then completes the IP address setting control.

When the IP address of the LAN interface on the IP telephone apparatus is changed in ST205 and ST206, nodes N1 to N3 connected under the IP telephone apparatus are assigned with new IP addresses through the DHCP server function of the IP telephone apparatus.

The present invention is explained in detail based on the particular embodiments above. However, the embodiments are presented as merely examples, and do not limit the present invention. For example, the communication apparatus according to the present invention is not limited to the above-described IP telephone apparatus, but may be a variety of apparatuses having a similar router function.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-357599 filed on Dec. 12, 2005, entire content of which is expressly incorporated by reference herein.

What is claimed is:

1. An IP telephone that connects to a network device, and relays communication between the network device and an IP network, the IP telephone comprising: an address assigner that assigns a first IP address within a reserved range of IP addresses to the network device; an address memory that stores a second IP address, which is an address of a LAN interface of the IP telephone; an address conflict determiner that determines whether the second IP address conflicts with the first IP address; and an address setter that changes the second IP address to a third IP address outside of the reserved range of IP addresses.

2. The IP telephone according to claim 1,
wherein when the third IP address conflicts with the first IP address, the address setter changes the third IP address to a fourth IP address selected from a first address space, the first address space being different from a second address space to which the third IP address belongs.

3. A method for setting an IP address of an IP telephone that connects to a network device, relays communication between the network device and a IP network, and assigns a first IP address within a reserved range of IP addresses to the network device, the method being performed by the IP telephone and comprising: determining whether a second IP address, which is an address of a LAN interface of the IP telephone, conflicts with the first IP address; and changing the second IP address to a third IP address outside of the reserved range of IP addresses, when the second IP address conflicts with the first IP address.

4. The method for setting the IP address of the IP telephone according to claim 3, further comprising:
changing the third IP address to a fourth IP address selected from a first address space, the first address space being different from a second address space to which the third IP address belongs, when the third IP address conflicts with the first IP address.

5. A communication system, comprising: a network device; and IP telephones that relays communication between the network device and an IP network, wherein the IP telephone comprises: an address assigner that assigns a first IP address within a reserved range of IP addresses to the network device; an address memory that stores a second IP address, which an address of a LAN interface of the IP telephone; an address conflict determiner that determines whether the second IP address conflicts with the first IP address; and an address setter that changes the second IP address to a third IP address outside of the reserved range of IP addresses.

\* \* \* \* \*